US011518513B2

(12) United States Patent
Theodore et al.

(10) Patent No.: US 11,518,513 B2
(45) Date of Patent: Dec. 6, 2022

(54) INTELLIGENT LOCATION AWARENESS FOR UNMANNED SYSTEMS

(71) Applicant: Raytheon Company, Waltham, MA (US)

(72) Inventors: David Theodore, Austin, TX (US); Torsten Staab, Bristow, VA (US)

(73) Assignee: Raytheon Company, Waltham, MA (US)

( * ) Notice: Subject to any disclaimer, the term of this patent is extended or adjusted under 35 U.S.C. 154(b) by 392 days.

(21) Appl. No.: 16/791,250

(22) Filed: Feb. 14, 2020

(65) Prior Publication Data

US 2020/0307787 A1 Oct. 1, 2020

Related U.S. Application Data

(60) Provisional application No. 62/806,342, filed on Feb. 15, 2019.

(51) Int. Cl.
*B64C 39/02* (2006.01)
*G05D 1/00* (2006.01)
*B64F 5/60* (2017.01)
*G08G 5/00* (2006.01)

(52) U.S. Cl.
CPC ............. *B64C 39/024* (2013.01); *B64F 5/60* (2017.01); *B64C 2201/027* (2013.01); *B64C 2201/141* (2013.01)

(58) Field of Classification Search
CPC ............ B64C 39/024; B64C 2201/027; B64C 2201/141; B64C 2201/14; B64C 39/02; B64F 5/60; G08G 5/0008; G08G 5/0013; G08G 5/0021; G08G 5/0052; G08G 5/0069; G08G 5/00; G05D 1/00
See application file for complete search history.

(56) References Cited

U.S. PATENT DOCUMENTS

| 8,214,147 | B2 | 7/2012 | Cheok et al. | |
|---|---|---|---|---|
| 10,725,139 | B1 * | 7/2020 | Duksta | G01S 5/0242 |
| 10,853,942 | B1 * | 12/2020 | Boyd | G06V 20/17 |
| 10,876,920 | B1 * | 12/2020 | McFarland | G01M 9/065 |
| 10,891,868 | B1 * | 1/2021 | Parodi | G08G 5/0013 |

(Continued)

FOREIGN PATENT DOCUMENTS

| CN | 106595659 A | 4/2017 |
|---|---|---|
| CN | 108303710 A | 7/2018 |

(Continued)

*Primary Examiner* — Yonel Beaulieu
(74) *Attorney, Agent, or Firm* — Daly, Crowley, Mofford & Durkee, LLP

(57) ABSTRACT

In some embodiments, a method for determining a location of an unmanned system (UMS) can include: receiving data from a plurality of data sources, wherein the data sources include a geolocation sensor and at least one of an RF receiver, a RADAR system, a LIDAR system, a SONAR system, an infrared camera, a Simultaneous Location and Mapping Algorithm (SLAM) system, an inertial sensor, or an acoustic sensor; determining a reliability of one or more of the data sources based on the received data; assigning weights to the data sources based at least in part on the determination of the reliability of the one or more data sources; and determining the location of the UMS using the received data and the assigned weights.

20 Claims, 5 Drawing Sheets

(56) References Cited

U.S. PATENT DOCUMENTS

| | | | |
|---|---|---|---|
| 2003/0164794 A1 | 9/2003 | Haynes et al. | |
| 2016/0154112 A1 | 6/2016 | Nichols | |
| 2016/0376004 A1* | 12/2016 | Claridge | B64C 39/024 |
| | | | 701/3 |
| 2017/0238505 A1* | 8/2017 | Gordon | A01K 29/005 |
| 2017/0323129 A1 | 11/2017 | Davidson et al. | |
| 2017/0369168 A1* | 12/2017 | Hwang | A61L 9/14 |
| 2018/0077518 A1* | 3/2018 | Nguyen | G08G 1/161 |
| 2018/0204469 A1* | 7/2018 | Moster | G05D 1/0094 |
| 2019/0087145 A1* | 3/2019 | Park | G01S 19/45 |
| 2020/0117197 A1* | 4/2020 | Oudwan | B64C 39/024 |
| 2020/0379124 A1* | 12/2020 | Moore | G01S 17/89 |
| 2021/0380224 A1* | 12/2021 | Clark | G05D 1/0016 |

FOREIGN PATENT DOCUMENTS

| | | |
|---|---|---|
| CN | 108827306 A | 11/2018 |
| WO | WO 2015/012934 A9 | 1/2015 |

* cited by examiner

INTELLIGENT LOCATION AWARENESS FOR UNMANNED SYSTEMS

CROSS-REFERENCE TO RELATED APPLICATIONS

This application claims the benefit under 35 U.S.C. § 119 of provisional patent application No. 62/806,342 filed on Feb. 15, 2019, which is hereby incorporated by reference herein in its entirety.

BACKGROUND

Unmanned Systems (UMS's) such as Unmanned Aircraft Systems (UAS's) operate in a variety of environments and require a varying degree of accuracy in their calculation of location, whether it is the absolute location or location relative to nearby objects. Many commercial UMS's commonly use Global Positioning System (GPS) or controlling signals from human operators to provide flight plans, but UMS's with critical mission or cargo may require location awareness that does not rely on outside information sources. In addition to location awareness, UAS's may require spatial awareness relative to other air-systems (manned or unmanned) or other obstacles to aid in collision avoidance, particularly in congested or hostile environments. Location awareness and collision avoidance may be further complicated in situations where malicious, jammed, or malfunctioning data sources are present.

SUMMARY

It is appreciated herein that there exists a need for improved location awareness techniques and intelligent systems that facilitate location determination in such UMS's. Many unmanned systems (UMS's) rely on radiofrequency (RF) communications to deliver critical information including flight direction instructions. When these signals are lost and/or jammed, a UMS needs other means providing location awareness to prevent collisions and help the UMS reach its intended target.

According to one aspect of the present disclosure, a method for determining a location of an unmanned system (UMS) can include: receiving data from a plurality of data sources, wherein the data sources include a geolocation sensor and at least one of an RF receiver, a RADAR system, a LIDAR system, a SONAR system, an infrared camera, a Simultaneous Location and Mapping Algorithm (SLAM) system, an inertial sensor, or an acoustic sensor; determining a reliability of one or more of the data sources based on the received data; assigning weights to the data sources based at least in part on the determination of the reliability of the one or more data sources; and determining the location of the UMS using the received data and the assigned weights.

In some embodiments, the determined location may be different from a location received from the geolocation sensor. In some embodiments, the method can further include providing the determined location to a guidance control system of the UMS. In some embodiments, determining the reliability of the one or more of the data sources can include determining whether the one or more of the data sources are malfunctioning based on the received data. In some embodiments, determining whether the one or more of the data sources are malfunctioning can include: measuring a noise level in the received data; and comparing the measured noise level to a threshold noise level to determine if a data source is malfunctioning. In some embodiments, determining whether the one or more of the data sources are malfunctioning can include comparing at least a portion of the received data to historical data collected by the UMS or another UMS.

In some embodiments, determining the reliability of the one or more of the data sources comprises determining whether the one or more of the data sources are cryptographically verified based on the received data. In some embodiments, determining the reliability of the one or more of the data sources comprises determining whether the one or more of the data sources are exhibiting an anomaly based on correlating data received from two different data sources from the plurality of data sources. In some embodiments, the plurality of data sources can include one or more other UMS's providing location information, and correlating the received data can include correlating the location information received from the one or more other UMS's to the location received from the geolocation sensor.

In some embodiments, assigning the weights to the data sources can include progressively weighting data sources according to a prioritization, wherein the prioritization is predetermined or dynamically determined. In some embodiments, the prioritization may be in the order of: the RF receiver; the geolocation sensor; the SLAM system; the RADAR system, the LIDAR system, the SONAR system, or the infrared camera or a combination thereof; and the inertial sensor. In some embodiments, the method can include: during a first mission, generating a three-dimensional (3D) location graph based on location data obtained from the geolocation sensor and further based on data received from at least one other one of the plurality of data sensors; and during a second mission, using the 3D location graph to infer a location of the UMS. In some embodiments, the 3D location graph can include a plurality of voxels corresponding to location of the UMS during the first mission, wherein the voxels are associated with data collected by the UMS using the plurality of data sources at corresponding location.

According to one aspect of the present disclosure, an unmanned system (UMS) can include: a plurality of data sources including a geolocation sensor and at least one of an RF receiver, a RADAR system, a LIDAR system, a SONAR system, an infrared camera, a Simultaneous Location and Mapping Algorithm (SLAM) system, or an inertial sensor; a guidance control system; and an intelligent location awareness module (ILAM) executable on processor. The ILAM can be configured to: receive data from the plurality of data sources; determine a reliability of one or more of the data sources based on the received data; assign weights to the data sources based at least in part on the determination of the reliability of the one or more data sources; determine a location of the UMS using the received data and the assigned weights, wherein the determined location is different from a location received from the geolocation sensor; and provide the determined location to the guidance control system.

In some embodiments, the ILAM may be configured to determine the reliability of the one or more of the data sources by determining whether the one or more of the data sources are malfunctioning based on the received data. In some embodiments, the ILAM can be configured to determine whether the one or more of the data sources are malfunctioning by measuring a noise level in the received data; comparing the measured noise level to a threshold noise level to determine if a data source is malfunctioning. In some embodiments, the ILAM may be configured to determine a reliability of the one or more of the data sources by determining whether the one or more of the data sources are exhibiting an anomaly based on a correlation of the received data. In some embodiments, the plurality of data sources can include one or more other UMS's providing location information and the ILAM may be configured to correlate the location information received from the one or more other UMS's to the location received from the geolocation sensor. In some embodiments, the ILAM may be configured to during a first mission, generate a three-dimensional (3D) location graph based on location data obtained from the geolocation sensor and further based on data received from at least one other one of the plurality of data sensors; and during a second mission, use the 3D location graph to infer a location of the UMS.

According to one aspect of the present disclosure, an intelligent location awareness device can include an interface configured to receive data from a plurality of data sources including a geolocation sensor and at least one of an RF receiver, a RADAR system, a LIDAR system, a SONAR system, an infrared camera, a Simultaneous Location and Mapping Algorithm (SLAM) system, or an inertial sensor; a detection and verification module; and a location determination module. The detection and verification module may be configured to determine a reliability of one or more of the data sources based on the received data; assign weights to the data sources based at least in part on the determination of the reliability of the one or more data sources. The location determination module may be configured to determine a location of the UMS using the received data and the assigned weights, and provide the determined location to a guidance control system.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

As used herein, the terms "tier" and "module" refer to a collection of hardware and/or software configured to perform and execute the processes, steps, or other functionality described in conjunction therewith. As used herein, the term "absolute location" refers to location of an entity (e.g., a UMS) based on a fixed point on Earth. The term "relative location" refers to the position of an entity based on its location with respect to other locations or entities.

While embodiments of the present disclosure may be shown and described in the context of unmanned aerial systems (UAS's), the systems and methods sought to be protected herein can be broadly applied to various types of systems, including manned or unmanned air, water, or ground-based systems such as UAS's (e.g., UAS's having rotors or jet propulsion systems), autonomous ground vehicles, unmanned ships, and unmanned underwater vehicles.

Figure 1:
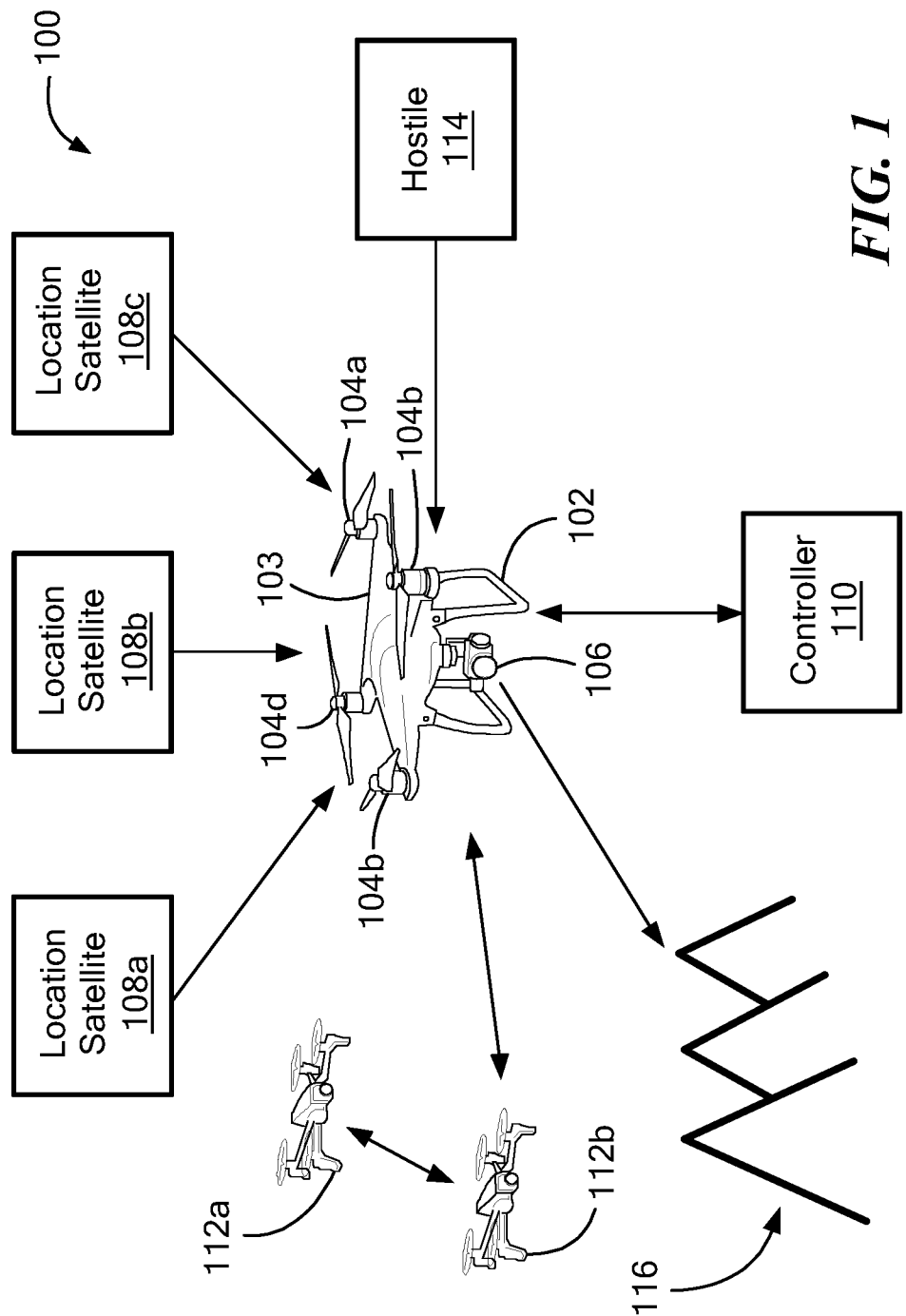
FIG. 1 is a diagram of an environment in which an unmanned system (UMS) can operate, according to some embodiments of the present disclosure.

FIG. 1 shows an illustrative environment 100 in which a UAS or other type of UMS can operate. An illustrative UMS 102 can include a body 103, a plurality of rotors 104a, 104b, 104c, 104d (104 generally), and one or more cameras 106. Cameras 106 can include, for example, an infrared camera, a conventional visible-spectrum camera, and/or a video camera. Cameras 106 may be configured to capture images/video of the UMS's environment, such as images/video of landscape features 116.

In addition to cameras 106, body 103 can house or otherwise support various other data sources or "modalities" such as a radio frequency (RF) receiver or transceiver, a geolocation sensor, a RADAR system, a SONAR system, a LIDAR (Light Detection and Ranging) system, a SLAM system (e.g., a system that implements a Simultaneous Location and Mapping Algorithm, or SLAM, using images or video obtained from cameras 106 and/or information obtained from RADAR/SONAR/LIDAR), and one or more inertial measurement sensors such as an accelerometer. In some embodiments, UMS 102 can have an onboard acoustic sensor array to aid in locating and navigation. As used herein, "data source" refers to any device or system via which an UMS can receive data or information about its environment, or about its attitude or location within its environment.

The geolocation sensor within UMS 102 can include, for example, a Global Positioning System (GPS) receiver. The geolocation sensor can receive location signals from a plurality of location beacons such as satellites 108a, 108b, 108c, etc. (108 generally) and determine its absolute location using a trilateration procedure. In some embodiments, a relative location may be determined based on location information of one or more other vehicles/devices who are aware of or otherwise have determined their locations and shared with UMS 102. Absolute location may be represented, for example, as a (latitude, longitude) ordered pair, or as a (latitude, longitude, altitude) 3-tuple. While embodiments of the present disclosure may be described as using GPS, the subject matter sought to be disclosed herein can apply to other positioning systems such as the GLObal NAvigation Satellite System (GLONASS), China's BeiDou Navigation Satellite System, or the European Union's Galileo system.

Controller 110 can include a system or device, external from UMS 102, configured to deliver flight directions or other control information to UMS 102. In some embodiments, controller may be ground-based system or device. Controller 102 and UMS 102 may communicate using a wireless communication means, such as RF or optical-based means, or, in certain embodiments, a wired connection means. In some embodiments, UMS 102 can establish an encrypted channel with controller 110 and may receive and/or send messages over the encrypted channel.

The operating environment 100 can include on or more hostiles 114. A hostile 114 may correspond to an actor, device, or system capable of interfering with and disrupting normal operation of the UMS 102. For example, a hostile 114 can correspond to a jamming device capable of disrupting RF communication between UMS 102 and controller 110 (or an environment where such communications are at risk of being jammed). As another example, hostile 114 may include a system or device configured to spoof geolocation signals, that is to transmit inaccurate geolocation data over the same frequency used by legitimate location beacons (e.g., satellites 108).

The illustrative environment 100 in which UMS 102 operates can include on or more other UMS's 112a, 112b, etc. (112 generally). The other UMS's 112 can include other UMS's that seek to cooperate with UMS 102 (e.g., other UMS's under the same control 110 as the subject UMS 102) and/or other UMS's that are hostile to and seek to disrupt the subject UMS 102. In some embodiments, UMS 102 can exchange location information with other UMS's 112 over a wireless communications means such as RF or an optical communications channel (e.g., a channel formed using one or more lasers). Thus, other UMS's 112 in the environment can serve as additional data sources to the subject UMS 102.

In some embodiments, the subject UMS 102 and one or more other UMS's 112 can form an ad-hoc mesh network to exchange location information. For example, as illustrated in FIG. 1, a first other UMS 112a can exchange location information with a second other UMS 112b, which in turn can exchange the same or different location information with the subject UMS 102. In some embodiments, UMS's 102, 112 can communicate over cryptographically secure channels. In some embodiments, the UMS's 102, 112 can exchange location information on a continuous or near-continuous basis. As discussed further below, a subject UMS 102 may use location information received from other UMS's 112 to improve the accuracy and reliability of its location awareness.

As described in greater detail below, UMS 102 can include an intelligent location awareness module (ILAM) configured to combine (or "fuse") information from multiple data sources to determine the location of UMS. The ILAM can process and measure various characteristics of the data sources and make intelligent decisions on how to interpret and weight multi-modal data to prevent flawed determination of location information. Using the structures and techniques disclosed herein, a UMS 102 can determine its absolute or relative location in a manner that is more accurate and/or more reliable compared to existing systems.

Figure 2:
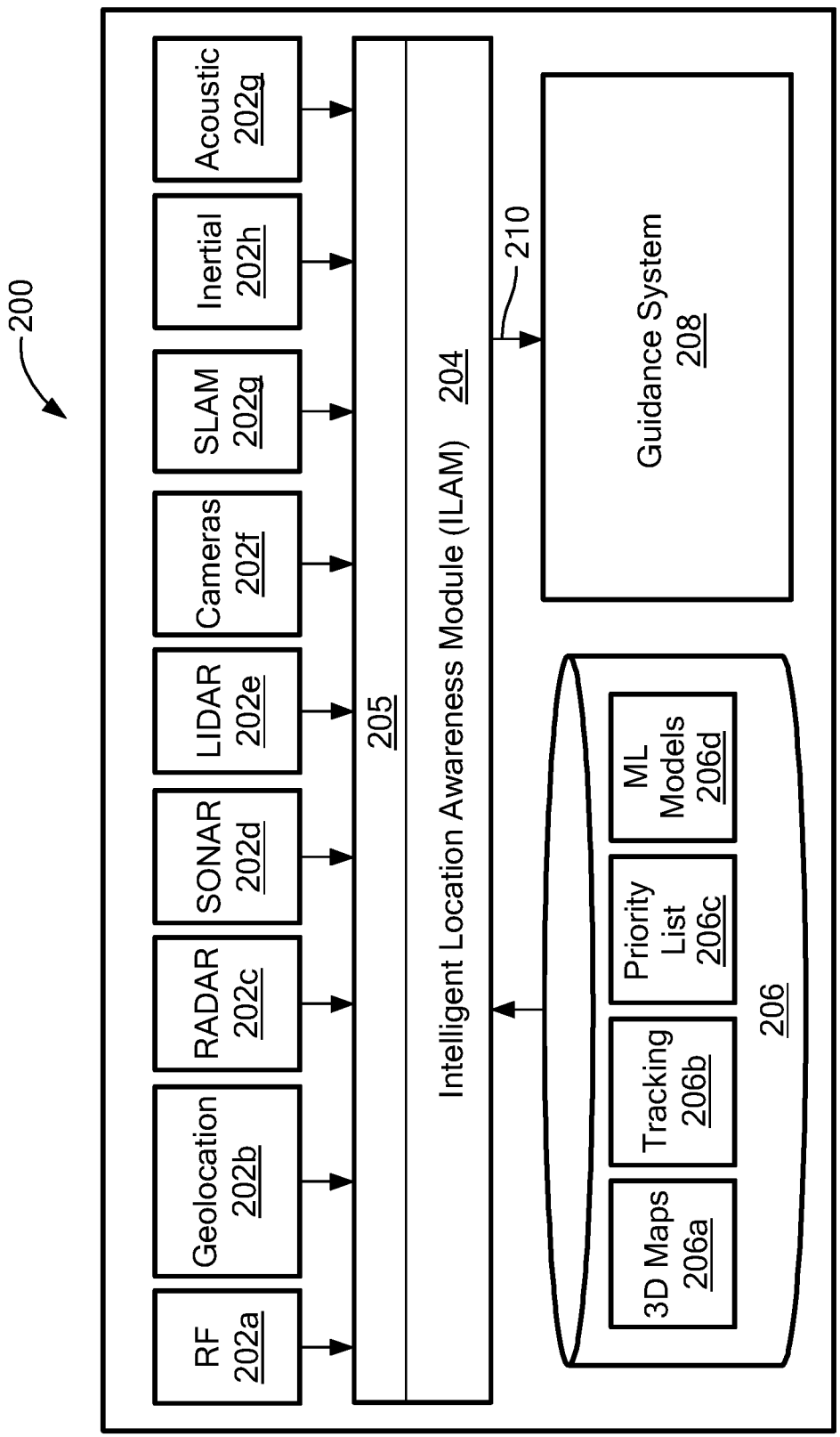
FIG. 2 is a block diagram of a UMS with intelligent location awareness, according to some embodiments of the present disclosure.

Referring to FIG. 2, an illustrative UMS 200 can include a plurality of data sources 202a, 202b, etc. (202 generally), an intelligent location awareness module (ILAM) 204, storage 206, and a guidance system 208. Data sources 202 can include, for example, an RF receiver 202a, a geolocation sensor 202b (e.g., a GPS receiver), a RADAR system 202c, a SONAR system 202d, a LIDAR system 202e, one or more cameras 202f, a SLAM system 202g, one or more inertial sensors 202h, and an acoustic sensor 202g. Storage 206 can include one or more non-volatile memory devices configured to store data onboard the UMS 200. In some embodiments, ILAM 204 can include an interface 205 configured to receive data from data sources 202.

RF receiver 202a can be configured to receive flight directions or other control information from a controller (e.g., controller 110 of FIG. 1). In some embodiments, RF receiver 202a can receive absolute or relative location information from the controller. RF receiver 202a can also receive absolute or relative location information from other UMS's (e.g., UMS's 112 of FIG. 1) or other devices. In some embodiments, RF receiver 202a can obtain signal strength measurements from nearby radios, such as Wi-Fi access points and/or femtocells/picocells operating in licensed or unlicensed frequency bands. Thus, while RF receiver 202a is shown as a single data source in FIG. 2, a UMS 200 can have multiple RF-based data sources, e.g., one RF data source corresponding to location information received from a controller, a second RF data source corresponding to location information received from another nearby UMS, a third RF data source corresponding to Wi-Fi signal strength measurements, etc. In some embodiments, RF receiver 202a may be provided as part of an RF transceiver, enabling UMS 202 to both send and receive location data with other a controller and other nearby VMS's. In some embodiments, optical communication means are included in addition, or as an alternative, to the RF transceiver.

Geolocation sensor 202b can be configured to receive signals from GPS satellites or other location beacons and determine the UMS's location using a trilateration procedure. Cameras 202f can include, for example, an infrared camera or a visible-wavelength camera configured to capture images or video of the UMS's environment.

SLAM system 202g can use information from RADAR 202c, SONAR 202d, LIDAR 202e, and/or cameras 202f to perform Simultaneous Location and Mapping, or SLAM. For example, SLAM system 202g can generate or update stored 3D maps 206a of the UMS's environment while simultaneously keeping track of the UMS's location within that environment. SLAM system 202g can compare image data and other information obtained from RADAR/SONAR/LIDAR/cameras to 3D maps of an operating environment to estimate the location of UMS 202. SLAM system 202g can track the location of the UMS 202 over time in storage 206b.

Inertial sensors 202h can include, for example, an accelerometer, gyroscope, magnetometer, and/or compass. In some embodiments, inertial sensors 202h can be provided as an inertial measurement unit (IMU). The data sources 202 illustrated in FIG. 2 are merely illustrative and the subject matter sought to be protected herein is not limited to any particular combination of data sources. In some embodiments, an ILAM 204 can receive data from two or more distinct data sources 202, such as a geolocation sensor and a data source of a different modality.

Acoustic sensor 202g can include any device or system to provide acoustic sensing for location determination. For example, acoustic sensor 202g can include an onboard 360-degree microphone array could help the UMS with location determination (e.g., by listening for sounds from nearby roadways, railroad tracks, or airports). Through baseline comparisons, these location-dependent acoustic signatures could be used to independently confirm approximate location and estimate distances under certain conditions.

ILAM 204 can receive data from the data sources 202 and, based on the sensor data, can determine one or more estimates of the UMS's absolute location. Some data sources 202 may directly provide absolute location measurements, while other data sources may provide data or other measurements that can be indirectly used to calculate absolute location. For example, geolocation sensor 202b may directly provide absolute location in the form of latitude, longitude, and altitude.

As another example, RF receiver 202a can be used to indirectly determine location by measuring signal strength from nearby RF transmitters (e.g., Wi-Fi hotspots or terrestrial radio or television transmitters) and then ILAM 204 can use one or more techniques to determine or at least approximate the UMS's geolocation using the signal strength measurements. In some embodiments, ILAM 204 can use signal strength measurements from three or more RF transmitters to determine the UMS's absolute location using a trilateration process. In some embodiments, ILAM 204 can determine the geolocation of a nearby RF transmitter using one or more unique characteristics of a received RF signal (e.g., SSID in the case of Wi-Fi) and a lookup table of known transmitter locations. In the case where trilateration is not feasible (e.g., because RF receiver 202a cannot measure signal strength from at least three nearby transmitters), ILAM 204 may combine a known transmitter location and a signal strength measurement to determine that the UMS is within a given radius of the transmitter location, thus providing an approximate location determination.

As another example, RF receiver 202a may receive relative location information from a controller or nearby cooperative UMS's, and the relative location information can be combined with another source of data to compute an absolute location of the UMS 200. As another example, measurements from inertial sensors 202h can be combined with a last known location to determine a current location of the UMS.

ILAM 204 can receive data from various data sources 202 and make intelligent decisions on how to interpret and combine the multi-modal data so as to provide, as output 210, a single "best" estimate of the UMS's absolute location. ILAM 204 may combine information from multiple data sources 202 using an intelligent weighting process to improve the accuracy and reliability of output 210. For example, ILAM 204 can detect when a particular data source 202 is unreliable due to a malfunction, jamming, spoofing, or some other condition that causes the data source 202 to provide incomplete or inaccurate data. When a particular data source is determined to be unreliable, ILAM 204 may adjust downwards its weighting relative to other (reliable) data sources until the data source is determined to again be reliable.

As some data sources 202 may be inherently more reliable or accurate in determining location than others, ILAM 204 may progressively weight data from multiple sources to prioritize data sources according to the needs of a particular UMS mission or operating environment. For example, ILAM 204 can prioritize the geolocation sensor 202b in scenarios where there is relatively unobstructed signal path from geolocation satellites/beacons to the UMS 200, and may deprioritize the geolocation sensor 202b in other scenarios, such as when the UMS 200 is operating in a tunnel and/or in GPS denied environments. In some embodiments, ILAM 204 may access a stored priority list 206c indicating the priority of particular data sources 202, e.g., in terms of relative or absolute weightings. The prioritization may be predetermined or dynamic (e.g., changing based on the mission, environment, current intelligence data, etc.).

In some embodiments, ILAM 204 can correlate information from multiple data sources to determine which data sources are exhibiting anomalies and therefore may be less reliable than normal. For example, using RF receiver 202a, ILAM 204 may receive location information from two or more nearby UMS's (e.g., UMS's 112a and 112b in FIG. 1) and compare the received location information to an absolute location measurement obtained from its own geolocation sensor 202b. Based on this comparison, ILAM 204 determine if either its own geolocation sensor 202b is unreliable (e.g., malfunctioning or being spoofed) or if one or more of the nearby UMS's is likely transmitting inaccurate location information.

In some embodiments, ILAM 204 can use one or more machine learning (ML) techniques to identify unreliable data sources. ILAM 204 can access trained ML models 206d stored within the UMS 200. The ML models 206d may be trained for a given application, mission, or environment. More detail of the structure and operation of ILAM 204 is shown and discussed below in the context of FIG. 3.

Guidance system 208 can be provided as a conventional guidance and control system for an unmanned system. Guidance system 208 can receive location information 210 from ILAM 204 and, using said information, can guide the UMS 200 while performing obstacle avoidance. Because ILAM 204 determines location using multiple data sources weighted in an intelligent manner, guidance system 208 can continue to function even if the RF receiver 202A, geolocation sensor 202b, or other individual data source malfunctions or is jammed. That is, ILAM 204 can enable the UMS 200 to carry out its mission while prevent collisions even when subject to malfunctions or hostile threats. While not explicitly shown in FIG. 2 example, it should be appreciated that UMS 200 may include one or more processors that may be coupled (e.g., via a bus) to one or more other components (such as the ILAM 204 and storage 206) of the UMS 200. In some embodiments, where one or more of the above discussed modules are implemented in software, the processors may execute one or more of the above modules discussed herein and/or use information and/or routines stored in the memory/storage 206 to control the operation of the UMS 200 in accordance with the methods and techniques described herein.

Figure 3:
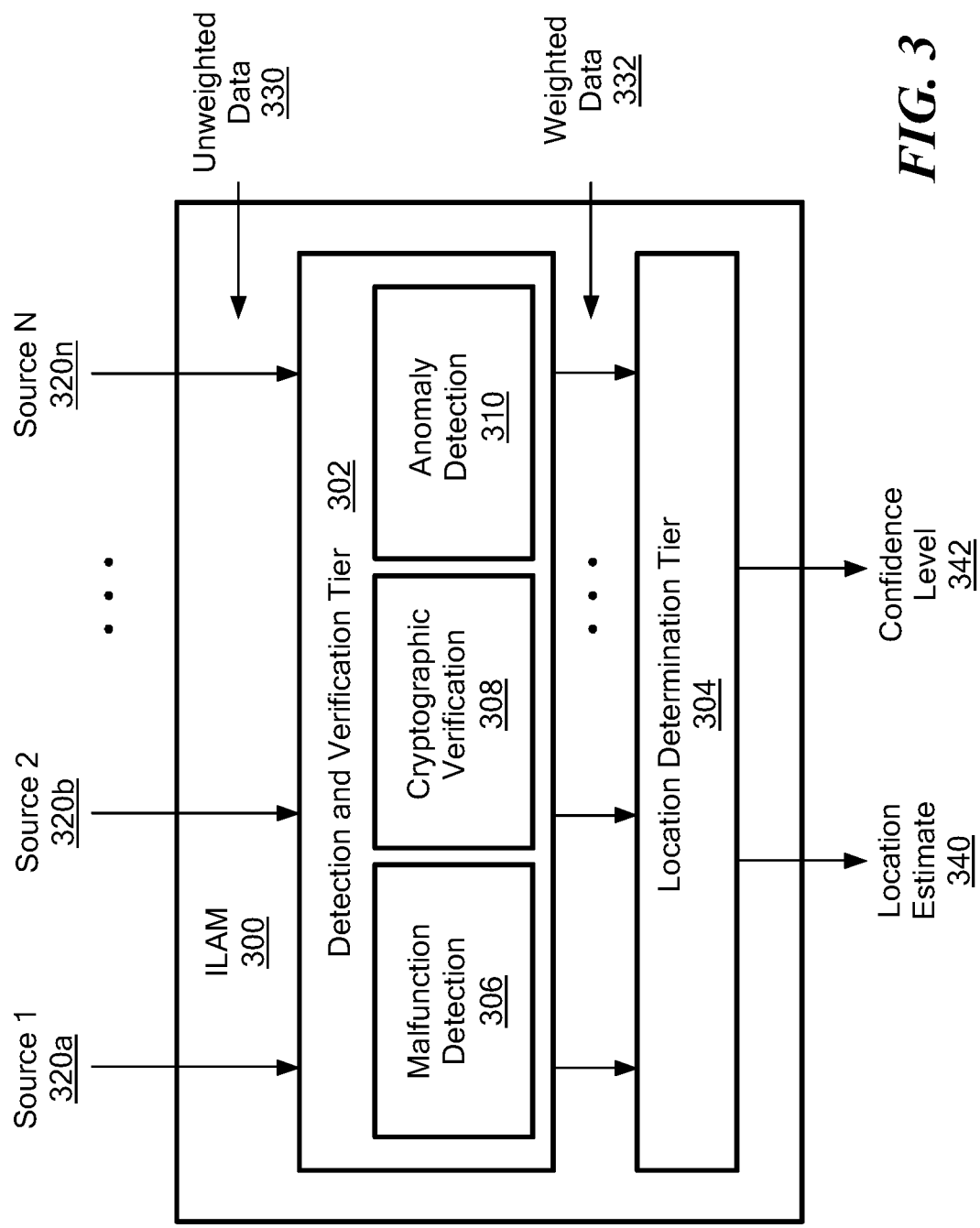
FIG. 3 is a block diagram of an intelligent location awareness module (ILAM) that can be provided within a UMS, according to some embodiments of the present disclosure.

Turning to FIG. 3, according to some embodiments, an illustrative ILAM 300 can include a detection and verification tier 302 and a location determination tier 304. Detection and verification tier 302 can receive, as input, data from a plurality of data sources 320a, 320b, etc. (320 generally). Data sources 320 can include one or more of data sources 202 shown and described in the context of FIG. 2. A particular data source 320 can provide direct location data, in terms of absolute or relative location, or can provide data, measurements, or other information that can be indirectly used to calculate location. As output, detection and verification tier 302 can generate weighted data 332 corresponding to the weighted version of the original (unweighted) source data 330. Using weighted data 332, location determination tier 304 can generate a single location estimate 340 and a corresponding confidence level 342. The estimated location output 340 can be used by a guidance system (e.g., guidance system 208 in FIG. 2) within or external to a UMS.

The illustrative detection and verification tier 302 can include a malfunction detection module 306, a cryptographic verification module 308, and an anomaly detection module 310.

Malfunction detection module 306 can detect malfunctioning sensors and other data sources 320. For example, module 306 can detect high levels of noise in an RF signal or RADAR system output. As another example, module 306 can detect if a geolocation sensor is not providing up-to-date coordinates. As another example, module 306 can detect high levels of heat interference that may negatively impact an infrared camera. In some embodiments, malfunction detection module 306 may compare a measured value from a particular data source against a predetermined threshold value to determine if the data source is malfunctioning. For example, module 306 can compare a signal-to-noise ratio (SNR) of a received RF signal against a minimum acceptable SNR threshold to determine if the RF receiver is malfunctioning. As another example, module 306 can compare an RF signal strength measurements (e.g., from a nearby Wi-Fi hotspot) with historical data. A significant discrepancy between a current measurement and historical measurements could be indicative of an issue (e.g., an antenna malfunction, a degradation in RF receiver performance, or an attempt to jam or spoof an RF signal).

In the case of a SLAM system or other machine-vision based data source, malfunction detection module 306 can, on a continuous or intermittent basis, run object detection and classification algorithms (e.g., using nearby landmarks of geo-spatial markers) and verify that the algorithm output is within a predetermined range of expected outputs.

Cryptographic verification module 308 can verify that certain data sources 320 are properly signed, authenticated, or otherwise comply with expected cryptographic conventions. For example, module 308 can verify that GPS data includes accurate cryptographic signatures. As another example, module 308 can verify that control messages received from a controller (e.g., controller 110 in FIG. 1) are properly authenticated. In some embodiments, cryptographic verification module 308 may access a list of known valid cryptographic signatures and use this list to verify data sources 320. In some embodiments, module 308 can access a list of signatures and fingerprints that are known to be used in spoofing-type attacks and use this list to detect data sources that have likely been spoofed. For example, module 308 can access a list of message signatures and/or digital certificates that incorporate hardware-specific, globally-unique identifiers, such as a MAC address or a CPU's serial number.

In some embodiments, a fingerprint may be associated with a RF signal. For example, minute differences in manufacturing process that cause a device (e.g., an RF transmitter) to a have slightly different, but still acceptable performance profile (e.g., in terms of RF noise profile, operating frequency spectrum, etc.) than the same make and model device from another production run. Module 308 can compare the current signal with a historical from the same one (e.g., using a spectrum analysis technique) to detect such differences and identify that a transmitter has been spoofed or tampered with.

Anomaly detection module 310 can use various machine intelligence (MI) techniques to identify anomalies in particular data sources 320. For example, module 310 can correlate multiple data sources 320 to identify statistical outliners or disagreement between the data indicating that at least one of the data sources is unreliable. For example, location data received from two or more nearby UMS's can be correlated with local GPS data to determine if the local GPS receiver or data is unreliable (e.g., malfunctioning or being spoofed). That is, if multiple nearby UMS's report generally the same location (within some known range of uncertainty) but that location is significantly different from the local GPS data, then module 310 may determine that the local GPS data is unreliable. Alternatively, if a first nearby UMS reports location that is consistent with local GPS data and a second nearby UMS reports inconsistent location data, then anomaly detection module 310 may determine that it is the second nearby UMS that is unreliable.

In some embodiments, module 310 can compare a determined location against historical location data to detect an anomaly. For example, if the UMS is flying a mission route that it previously flew, it can detect an anomaly if current location data is inconsistent with location data recorded during the previous mission.

In some embodiments, module 310, can intermittently or continuously look up and correlate onboard camera-detected objects (e.g., landmarks) with a geo-indexed landmark database. For example, the UMS is flying in a particular environment with a well-known landmark, but the camera systems do not detect the landmark at the expected geolocation, then an anomaly may be declared. A similar technique can be used to verify proper operation of inertial sensors.

In some embodiments, ILAM 300 can use a consensus forming or quorum voting-based heuristic to detect an anomaly. For example, if a majority of data sources indicate generally the same location and one or more other data sources indicate a substantially different location, then ILAM 300 can disregard the outliers and rely on the majority.

Correlation of multiple data sources can provide insight as to which sources can be trusted. This sort of outlier detection provides fall backs that prevent a malfunction sensor from bringing down the entire UMS.

In some embodiments, anomaly detection module 310 can use machine learning (ML) algorithm and advanced signals processing (e.g., Kalman Filter) to detect unreliable data sources or estimate location. In particular, ILAM 300 can use one or more ML models trained to recognize characteristics of jammed or malfunctioning sensors. Module 310 may generate an multi-dimensional, multi-variate input or "feature" vector that includes data values or measurements obtained from one or more data sources 320 (e.g., GPS, acoustic, heading, altitude, speed, RF, etc.) and then feed the input vector into a machine learning-based classifier to detect anomalies. For example, the multi-dimensional feature vector can be fed into a machine learning algorithm, such as logistic regression or a deep learning network, to identify certain data sources as reliable versus unreliable (in the case of a classification model), to assign a reliability score to a particular data source (in the case of a regression model), and/or to generate probabilistic location estimates.

Based on the results of the malfunction detection 306 module, cryptographic verification 308 module, and/or anomaly detection 310 module, the detection and verification tier 302 can assign weights to the data sources 320. That is, the detection and verification tier 302 can be used to generate weighted data 332 based on the original, unweighted source data 330. The weight assigned to a particular data source can be proportional to its reliability as determined by modules 306, 308, and 310. For example, a data source data 320 that is determined to be malfunctioning by module 306 may be assigned a low weight, such as zero. As another example, the weight for a particular data source 320 may be calculated based on the output of a ML model used by anomaly detection module 310. In this case where the weight of one or more data sources 320 is lowered based on the results of modules 306, 308, 310, the weights of other data sources may be increased in response such that the total weighting across all data sources equals 100%.

Detection and verification tier 302 can progressively weight data sources 320 based on a prioritization scheme. That is, even if two data sources are both determined to be equally reliable by modules 306, 308, 310, the detection and verification tier 302 may still assign different weights to the two data sources. For example, cryptographically signed control messages received from a controller may be prioritized over GPS data and thus assigned a higher weighting. As another example, GPS data may be prioritized over data obtained from a SLAM system.

An example scenario is now provided to aid in the understanding of the operation of detection and verification tier 302. In this example it is assumed that data sources 320 include a GPS receiver, an RF receiver, a RADAR, LIDAR, an infrared camera, a SLAM system, and inertial sensors. Malfunction determination module 306 determines that GPS data is partially missing and, as a result, the GPS receiver may be assigned a weight of 20%. Cryptographic verification module 308 determines an authentication failure for control messages and, as a result, the RF receiver may be assigned a weight of 0%. Malfunction determination module 306 detects excessive noise from the RADAR (e.g., by comparing a SNR value from the RADAR to a minimum threshold value) and, as a result, RADAR may be assigned weight of 10%. Malfunction determination module 306 may detect excessively high levels of heat interference, as a result, the infrared camera may be assigned a weight of 10%. Anomaly detection module 310 detects a data disagreement from the inertial sensors and, thus, these sensors may be assigned a weight of 10%. The LIDAR and SLAM system are both determined to be fully functional and reliable and, thus, are assigned weights of 30% and 20%, respectively, based on priority levels assigned to these data sources. In some embodiments, the priority levels may be changed, e.g., based on a mission, geographic area/route of the UMS, historical data (from different sources/sensors) collected from past missions, etc. The total weightings across the data sources is equal to 100%. It should be appreciated that the preceding scenario is merely illustrative and that the subject matter sought to be protected herein is not limited to any particular combination of data sources, priorities, or weightings.

Location determination tier 304 can use the weighted data 332 to generate an estimate of the UMS's absolute location 340 and a confidence level 342 associated with that estimate. In the case where a particular data source does not directly provide absolute location data, tier 304 may process the corresponding weighted data 332 to generate an absolute location estimate. For example, in the case of RF receiver, tier 304 can generate an absolute location estimate by obtaining RF signal strength measurements for nearby radios with known locations (e.g., from stationary Wi-Fi hotspots) and using a trilateration process to estimate an absolute location. As another example, tier 304 can translate relative location data to an absolute location estimate by combining it with a reference location (e.g., an absolute location obtained from a nearby UMS).

After processing the weighted sensor data 320 into one or more absolute location estimates, tier 304 can combine those estimates to generate a single location estimate 340. Example techniques that can be used to derive or calculate location estimate 340 include, but are not limited to, geo-spatial clustering, Kalman filtering, and Bayesian classifier.

In some embodiments, at least some of the processing described above for ILAM 300 may be performed at a ground control station (e.g., at controller 110 of FIG. 1). As one example, to detect malfunctions and/or anomalies in an onboard SLAM system, ILAM 300 may transmit images or video to ground control where object detection and analysis is performed.

Figure 4:
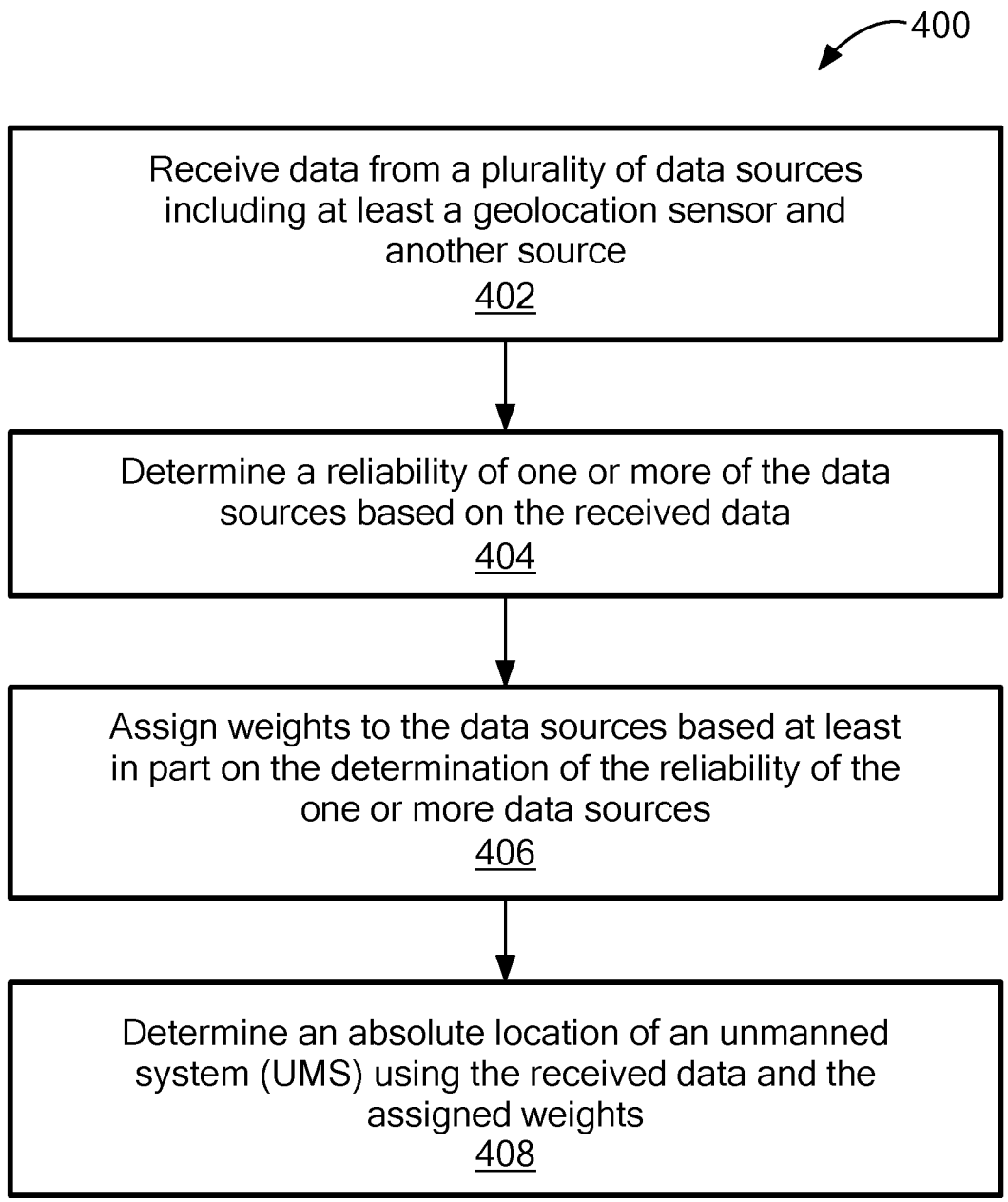
FIG. 4 is a flow diagram showing an illustrative process for intelligent location awareness, according to some embodiments of the present disclosure.

FIG. 4 shows an illustrative method 400 for determining a location of UMS, according to some embodiments of the present disclosure. In some embodiments, method 400 can be implemented within an Intelligent Location Awareness Module (ILAM), such as ILAM 204 of FIG. 2.

At block 402, data can be received from a plurality of data sources. In some embodiments, the data sources can include a geolocation sensor and at least one of an RF receiver, a RADAR system, a LIDAR system, a SONAR system, an infrared camera, a Simultaneous Location and Mapping Algorithm (SLAM) system, an inertial sensor, or an acoustic sensor.

At block 404, a reliability of one or more of the data sources can be determined based on the receive data. In some embodiments, determining reliability of the data sources can include determining whether the one or more of the data sources are malfunctioning based on the received data. For example, this can include measuring a noise level in the received data and comparing the measured noise level to a threshold noise level to determine if a data source is malfunctioning. Other techniques and heuristics that can be used for detecting a malfunctioning data source are described above in the context of FIGS. 2 and 3.

In some embodiments, determining reliability of the data sources can include determining whether the one or more of the data sources are cryptographically verified based on the received data. For example, this can include verifying that GPS data includes accurate cryptographic signatures. Other techniques that can be used for cryptographic verification are described above in the context of FIGS. 2 and 3.

In some embodiments, determining reliability of the data sources can include identifying data sources that are exhibiting an anomaly based on a correlation data received from two or more different data sources. For example, in the case where the data sources include one or more other nearby UMS's, location information received from the other UMS's can be correlated with location data received from the geolocation sensor to determine if the geolocation sensor is reliable. Other techniques that can be used for anomaly detection are described above in the context of FIGS. 2 and 3.

At block 406, weights can be assigned to the data sources based at least in part on the determination of the reliability of the one or more data sources. In some embodiments, the data sources can be progressively weighted based on a prioritization of the data sources. Examples of data source prioritizations that can be used are discussed above in the context of FIGS. 2 and 3. In some embodiments, priority or bias values may be assigned to data sources in addition or in place of weights.

At block 408, the location of the UMS can be determined using the received data and the assigned weights. The determined location can be different from a location received from the geolocation sensor. In some embodiments, the location can be provided to a guidance control system of the UMS. In some embodiments, a machine classifier or advanced signal processing technique like a Kalman filter can be used to determine the UMS's location.

Figure 5A:
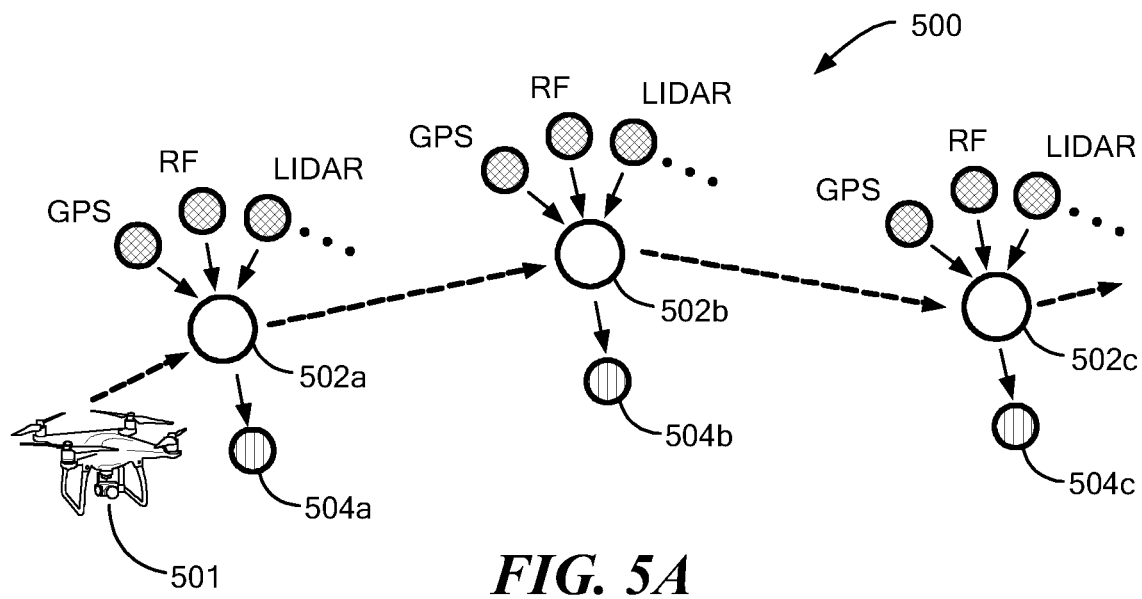
FIGS. 5A and 5B illustrate a geospatial mapping and inferencing technique that can be used within an ILAM, according to some embodiments of the present disclosure.
Figure 5B:
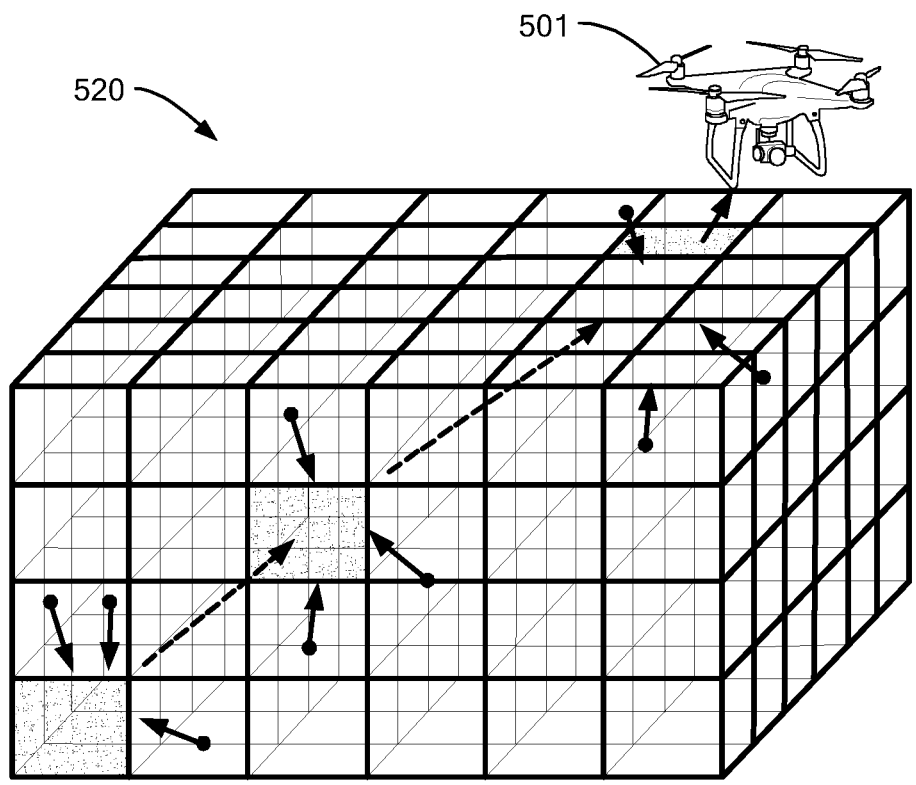

FIGS. 5A and 5B illustrate a geospatial mapping and inferencing technique that can be used to provide location awareness in a UMS. The technique may be implemented, for example, within an ILAM 204 of FIG. 2, and may be used in combination with other intelligent location awareness techniques disclosed herein (e.g., the anomaly detection and weighting techniques previously disclosed hereinabove).

As shown in FIG. 5A, a UMS 501 may follow a route 500 that includes, in order, waypoints 502a, 502b, 502c (502 generally). At each waypoint 502a, 502b, 502c, UMS may collect measurements and other data from a plurality of data sources such as a geolocation sensor (e.g., GPS), RF, LIDAR, etc. While the illustrative route 500 of FIG. 5A includes only three waypoints 502, in practice a UMS may collect data at an arbitrary number of locations (e.g., thousands or millions of locations). In some embodiments, a UMS 501 may collect data in a nearly continuous manner.

In some embodiments, the UMS 501 may collect location data and simultaneous collection data from one or more other data sources or modalities. During collection, the multi-modal data may be geo-referenced using the location data (e.g., RF data may be tagged or otherwise associated with particular absolute locations). The collected data may be stored onboard the UMS 501 and/or transmitted to a controller.

As shown in FIG. 5B, the collected geo-referenced data can be used to generate a three-dimensional (3D) location graph 520 (FIG. 5B). The location graph 520 includes a plurality of voxels, shown as cubes in FIG. 5B. A voxel may correspond to particular 3D geolocation along a UMS's flight path. Several real-time and historical measurements obtained from different data sources can be associated with a particular voxel. In some embodiments, the voxels that correspond to a particular flight path may be implemented in form of a directed graph to allow for efficient storage and fast lookups. The real-time and historical measurements associated with voxels can be stored in a multi-dimensional feature vector, according to some embodiments.

In some embodiments, the location graph 520 may be generated using a linear regression or a geospatial clustering algorithm. For example, a clustering algorithm may be used to calculate the centroid using the cluster formed by multiple location estimates derived from various data sources, where the centroid corresponds to a single or location estimate (i.e., the "best" estimate) determined based on the multiple estimates. In addition to using distance measurement between the points in the cluster, weights can be assigned to data sources (e.g., to prevent a noisy or unreliable source from negatively impacting the single location estimate).

The generated location graph 520 can then be used by the same UMS 501 or other UMS's (e.g., location graph 520 may be shared with others) to infer location when flying the same route on future missions when only partial or no direct location data is available (e.g., if the GPS receiver malfunctions or is jammed). For example, during a first mission, a UMS can collect data on a near-continuous basis (RF, camera, accelerometer, acoustic signature, etc.) and, using that data, determine "best" estimates of its location using various techniques described herein. The UMS can store the collected data along with the best location estimates for various locations corresponding to the voxels of 3D location graph 520. During a second mission along generally the same route, the UMS may pass through one or more of the same voxels it passed through previously. Assuming the UMS still has access to its historical flight data, it can now compare its real-time measurements with previous measurements. If for whatever reason any of its onboard sensors are not functioning properly (e.g., hardware failure or jamming), the UMS can use previous measurements it took at that location from the currently defunct or unreliable sensors to complement its situational awareness and improve its location estimate. In some embodiments it may also compare real-time data with historical values to detect malfunctions and anomalies.

In contrast to conventional SLAM systems and techniques, the geospatial mapping and inferencing technique disclosed herein is multi-modal, multi-dimensional such that various other data sources (e.g., nearby acoustic signatures, LIDAR measurements, etc.) can be used to improve fault tolerance and resiliency to jamming, spoofing, and other types of attacks.

It is appreciated that embodiments of the intelligent location awareness module disclosed herein can process and measure various characteristics from the variety of location and proximity type sensors and make intelligent decisions on how to interpret and weight the sensor data in calculation to prevent flawed determination of location information. When one data source fails, either by malfunction, jamming, or other reasons, another will provide the required information until all system are operational again. The intelligent location awareness module can revaluate system state in a continuous basis such that it dynamically adjusts weights as sensors become available or unavailable. As a result, embodiments of the present disclosure can improve the accuracy and reliability of location awareness in UMS's. Embodiments of the present disclosure can provide increased security to UMS's in congested, hostile, or other challenging environments. Training an intelligent system to recognize characteristics of jammed or malfunctioning sensors can significantly increase the reliability of absolute location calculations. Utilizing ML for these objectives can provide benefits that have not been realized in current location awareness or collision avoidance systems.

The methods, processes, and other subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

The manned and unmanned system described herein may include, in some implementations, one or more components and/or modules for performing various operations discussed above. Depending on the embodiment, such components and/or modules may be implemented completely in hardware, software or as a combination of software and hardware. The one or more components and/or modules can, and in some embodiments are, implemented fully in hardware, e.g., as individual circuits. Alternatively, rather than being implemented as circuits, all or some of the modules may be implemented in software and stored in the memory, with the modules controlling operation of the system to implement the functions corresponding to the modules when the modules are executed by a processor. In still other embodiments, various modules are implemented as a combination of hardware and software.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for determining a location of an unmanned system (UMS), the method comprising:
   receiving data from a plurality of data sources, wherein the data sources include a geolocation sensor and at least one of an RF receiver, a RADAR system, a LIDAR system, a SONAR system, an infrared camera, a Simultaneous Location and Mapping Algorithm (SLAM) system, an inertial sensor, or an acoustic sensor;
   determining a reliability of one or more of the data sources based on the received data;
   assigning weights to the data sources based at least in part on the determination of the reliability of the one or more data sources; and
   determining the location of the UMS using the received data and the assigned weights.

2. The method of claim 1 wherein the determined location is different from a location received from the geolocation sensor.

3. The method of claim 1, further comprising:
   providing the determined location to a guidance control system of the UMS.

4. The method of claim 1, wherein determining the reliability of the one or more of the data sources comprises determining whether the one or more of the data sources are malfunctioning based on the received data.

5. The method of claim 4, wherein determining whether the one or more of the data sources are malfunctioning comprises:
   measuring a noise level in the received data; and
   comparing the measured noise level to a threshold noise level to determine if a data source is malfunctioning.

6. The method of claim 4, wherein determining whether the one or more of the data sources are malfunctioning comprises comparing at least a portion of the received data to historical data collected by the UMS or another UMS.

7. The method of claim 1, wherein determining the reliability of the one or more of the data sources comprises determining whether the one or more of the data sources are cryptographically verified based on the received data.

8. The method of claim 1, wherein determining the reliability of the one or more of the data sources comprises determining whether the one or more of the data sources are exhibiting an anomaly based on correlating data received from two different data sources from the plurality of data sources.

9. The method of claim 8, wherein the plurality of data sources includes one or more other UMS's providing location information, and wherein correlating the received data comprises correlating the location information received from the one or more other UMS's to the location received from the geolocation sensor.

10. The method of claim 1, wherein assigning the weights to the data sources comprises progressively weighting data sources according to a prioritization, wherein the prioritization is predetermined or dynamically determined.

11. The method of claim 10, wherein the prioritization is in the order of:
   the RF receiver;
   the geolocation sensor;
   the SLAM system;
   the RADAR system, the LIDAR system, the SONAR system, or the infrared camera or a combination thereof; and
   the inertial sensor.

12. The method of claim 1, further comprising:
   during a first mission, generating a three-dimensional (3D) location graph based on location data obtained from the geolocation sensor and further based on data received from at least one other one of the plurality of data sensors; and
   during a second mission, using the 3D location graph to infer a location of the UMS.

13. The method of claim 12, wherein the 3D location graph comprises a plurality of voxels corresponding to location of the UMS during the first mission, wherein the voxels are associated with data collected by the UMS using the plurality of data sources at corresponding location.

14. An unmanned system (UMS) comprising:
   a plurality of data sources including a geolocation sensor and at least one of an RF receiver, a RADAR system, a LIDAR system, a SONAR system, an infrared camera, a Simultaneous Location and Mapping Algorithm (SLAM) system, or an inertial sensor;
a guidance control system; and
an intelligent location awareness module (ILAM) executable on processor and configured to:
receive data from the plurality of data sources;
determine a reliability of one or more of the data sources based on the received data;
assign weights to the data sources based at least in part on the determination of the reliability of the one or more data sources;
determine a location of the UMS using the received data and the assigned weights, wherein the determined location is different from a location received from the geolocation sensor; and
provide the determined location to the guidance control system.

15. The system of claim 14, wherein the ILAM is configured to determine the reliability of the one or more of the data sources by determining whether the one or more of the data sources are malfunctioning based on the received data.

16. The system of claim 15, wherein the ILAM is configured to determine whether the one or more of the data sources are malfunctioning by:
measuring a noise level in the received data; and
comparing the measured noise level to a threshold noise level to determine if a data source is malfunctioning.

17. The system of claim 16, wherein the ILAM is configured to determine a reliability of the one or more of the data sources by determining whether the one or more of the data sources are exhibiting an anomaly based on a correlation of the received data.

18. The system of claim 17, wherein the plurality of data sources includes one or more other UMS's providing location information, wherein the ILAM is configured to correlate the location information received from the one or more other UMS's to the location received from the geolocation sensor.

19. The system of claim 14, where the ILAM is configured to:
during a first mission, generate a three-dimensional (3D) location graph based on location data obtained from the geolocation sensor and further based on data received from at least one other one of the plurality of data sensors; and
during a second mission, use the 3D location graph to infer a location of the UMS.

20. An intelligent location awareness device, comprising:
an interface configured to receive data from a plurality of data sources including a geolocation sensor and at least one of an RF receiver, a RADAR system, a LIDAR system, a SONAR system, an infrared camera, a Simultaneous Location and Mapping Algorithm (SLAM) system, or an inertial sensor;
a detection and verification module configured to:
determine a reliability of one or more of the data sources based on the received data;
assign weights to the data sources based at least in part on the determination of the reliability of the one or more data sources; and
a location determination module configured to determine a location of the UMS using the received data and the assigned weights, and provide the determined location to a guidance control system.

\* \* \* \* \*